United States Patent
Suda (10) Patent No.: US 8,457,857 B2
(45) Date of Patent: Jun. 4, 2013

(54) BRAKING CONTROL DEVICE, AND BRAKING CONTROL METHOD

(75) Inventor: Rio Suda, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 333 days.

(21) Appl. No.: 12/990,120

(22) PCT Filed: May 7, 2009

(86) PCT No.: PCT/IB2009/005507
§ 371 (c)(1),
(2), (4) Date: Oct. 28, 2010

(87) PCT Pub. No.: WO2009/138836
PCT Pub. Date: Nov. 19, 2009

(65) Prior Publication Data
US 2011/0040465 A1    Feb. 17, 2011

(30) Foreign Application Priority Data

May 12, 2008   (JP) .................................. 2008-125300

(51) Int. Cl.
*B60T 8/32* (2006.01)
*G06F 19/00* (2006.01)

(52) U.S. Cl.
USPC .............................. 701/70; 701/93; 303/9.63

(58) Field of Classification Search
USPC ................... 701/70, 93; 303/9.63, 6.01, 9.62, 303/138; 91/369.2
See application file for complete search history.

(56) References Cited

U.S. PATENT DOCUMENTS

| | | | |
|---|---|---|---|
| 5,158,343 A | 10/1992 | Reichelt et al. | |
| 6,129,425 A * | 10/2000 | Onuma | 303/155 |
| 6,212,459 B1 | 4/2001 | Unterforsthuber | |
| 6,292,753 B1 * | 9/2001 | Sugimoto et al. | 701/301 |
| 6,473,681 B1 | 10/2002 | Eckert et al. | |
| 7,673,948 B2 * | 3/2010 | Otomo | 303/114.1 |
| 2002/0038977 A1 * | 4/2002 | Nitta et al. | 303/138 |
| 2005/0235820 A1 * | 10/2005 | Fujiwara et al. | 91/369.2 |
| 2008/0001473 A1 | 1/2008 | Mizutani et al. | |

FOREIGN PATENT DOCUMENTS

| | | |
|---|---|---|
| CN | 101096025 A | 1/2008 |
| DE | 197 43 960 A1 | 4/1999 |
| DE | 198 17 326 A1 | 10/1999 |
| EP | 1 787 881 A1 | 5/2007 |
| GB | 2 280 718 A | 2/1995 |
| JP | 11-217064 A | 8/1999 |
| JP | 2005-035466 A | 2/2005 |

* cited by examiner

OTHER PUBLICATIONS

Office Action issued Aug. 8, 2012 in DE 11 2009 001 159.4 and English translation thereof.

*Primary Examiner* — Tan Q Nguyen
(74) *Attorney, Agent, or Firm* — Kenyon & Kenyon LLP

(57) ABSTRACT

A first stroke sensor and a second stroke sensor in a braking control device detect the pedal depression amount. A brake ECU calculates a target wheel cylinder pressure by utilizing the detected pedal depression amount, and increases/decreases the wheel cylinder pressure by controlling the hydraulic actuator so as to achieve the calculated target wheel cylinder pressure. The brake ECU determines whether the brake pedal has been sharply depressed, by utilizing the pedal depression amount detected within a range thereof that is smaller than the pedal depression amount. If it is determined that the brake pedal has been sharply depressed, the brake ECU relaxes the restriction on the hydraulic pressure gradient at the time of increasing the wheel cylinder which is imposed when the brake pedal has not been sharply depressed.

9 Claims, 2 Drawing Sheets

BRAKING CONTROL DEVICE, AND BRAKING CONTROL METHOD

This is a 371 national phase application of PCT/IB2009/005507 filed 07 May 2009, claiming priority to Japanese Patent Application No. 2008-125300 filed 12 May 2008, the contents of which are incorporated herein by reference.

BACKGROUND OF THE INVENTION

1. Field of the Invention

The invention relates to a braking control technology and, more particularly, to a braking control technology equipped with a hydraulic actuator that is provided so as to be capable of increasing and decreasing the wheel cylinder pressure.

2. Description of the Related Art

As an oil pressure actuator for vehicles, such as motor vehicles and the like, there is known a linear valve that is opened according to a command current so as to increase the wheel cylinder pressure to a target wheel cylinder pressure. As a braking control device that controls such a linear valve, for example, a hydraulic pressure control device has been proposed which carries out a pulsation reduction control of restraining the rate of change of the command current in order to restrain the production of an unusual noise caused by oil pressure pulsation, and which stops the pulsation reduction control if the absolute value of a hydraulic pressure deviation is larger than a predetermined threshold value (e.g., refer to Japanese Patent Application Publication No. 2005-35466 (JP-A-2005-35466)). Besides, a braking assist force control device that determines whether or not the braking is an emergency braking by utilizing detection results provided by a stroke sensor that detects the amount of depression of a brake pedal has also been proposed (refer to, e.g., Japanese Patent Application Publication No. 11-217064 (JP-A-11-217064)).

It sometimes happens that the brake pedal is sharply depressed by a driver of the vehicle, for example, at the time of emergency. In such a case, there is a need to rapidly increase the braking force by sharply boosting the wheel cylinder pressure even if the hydraulic pressure gradient of the wheel cylinder pressure is usually restricted.

SUMMARY OF THE INVENTION

The invention provides a braking control device that performs a pulsation reduction control, and also rapidly increases the braking force when a brake pedal is sharply depressed.

An aspect of the invention relates to a braking control device that includes: a stroke sensor that detects a pedal depression amount of a brake pedal; a hydraulic actuator provided so as to be capable of increasing/decreasing wheel cylinder pressure; and a wheel cylinder pressure control portion that calculates a target wheel cylinder pressure by utilizing a detection result provided by the stroke sensor, and increases/decreases the wheel cylinder pressure by controlling the hydraulic actuator so as to achieve the target wheel cylinder pressure calculated. The wheel cylinder pressure control portion determines whether or not the brake pedal has been sharply depressed, by utilizing a detection result provided by the stroke sensor in a range of the pedal depression amount that is smaller than the pedal depression amount that is to give braking force to a wheel, and relaxes a restriction on a hydraulic pressure gradient at a time of increasing the wheel cylinder pressure which is imposed when the brake pedal has not been sharply depressed, if it is determined that the brake pedal has been sharply depressed.

The stroke sensor that detects the amount of depression of the brake pedal is able to detect the pedal depression amount in a range thereof that is smaller than the pedal depression amount that is to give braking force to the wheels. According to this aspect, the braking control device can determine whether or not the brake pedal has been sharply depressed, by utilizing the pedal depression amount detected by the stroke sensor. Therefore, in comparison with, for example, the case where a detection result provided by the master pressure sensor is used for the determination, it can be rapidly determined whether or not the brake pedal has been sharply depressed, and therefore the wheel cylinder pressure can be rapidly increased when the brake pedal is sharply depressed.

The wheel cylinder pressure control portion may calculate a pedal depression speed at a pedal depression amount that is smaller than the pedal depression amount used to calculate the target wheel cylinder pressure, by utilizing the detection result provided by the stroke sensor, and may determine whether or not the pedal depression speed calculated is greater than a predetermined threshold value, in order to determine whether or not the brake pedal has been sharply depressed. According to this construction, it can easily be determined whether or not the brake pedal has been sharply depressed.

It is also permissible that if it is determined that the brake pedal has been sharply depressed, the wheel cylinder pressure control portion does not impose the restriction on the hydraulic pressure gradient at the time of increasing the wheel cylinder pressure. According to this construction, it becomes possible to more rapidly increase the wheel cylinder pressure than in the case where the restriction is provided on the hydraulic pressure gradient of the wheel cylinder pressure.

The braking control device may further include a master pressure sensor that detects the master cylinder pressure. The wheel cylinder pressure control portion may determine whether or not the brake pedal has been sharply depressed, by utilizing the detection result from the master pressure sensor, and may relax the restriction on the hydraulic pressure gradient at the time of increasing the wheel cylinder which is imposed when the brake pedal has not been sharply depressed if it is determined by utilizing the detection result from the master pressure sensor that the brake pedal has been sharply depressed although it is determined by utilizing the detection result from the stroke sensor that the brake pedal has not been sharply depressed. According to this construction, the reliably of the determination as to whether or not the brake pedal has been sharply depressed can be heightened in comparison with the case where the determination is based only on the detection result provided by the stroke sensor.

Another aspect of the invention relates to a braking control method. This method includes the step of detecting a pedal depression amount of a brake pedal that is smaller than a pedal depression amount of the brake pedal that is to give braking force to a wheel, the step of determining whether or not the brake pedal has been sharply depressed, by utilizing the pedal depression amount detected; the step of detecting depression of the brake pedal to the pedal depression amount that is to give braking force to the wheel, and the step of relaxing restriction imposed on hydraulic pressure gradient when the brake pedal has not been sharply depressed, and increasing the wheel cylinder pressure, if the depression of the brake pedal to the pedal depression amount that is to give braking force to the wheel is detected and it is determined that the brake pedal has been sharply depressed.

Generally, in a range of the pedal depression amount that is smaller than the pedal depression amount that is to give braking force to the wheels, the pedal depression amount can be more easily detected than the master cylinder pressure. According to this aspect, since it is determined by utilizing the detected pedal depression amount whether or not the brake pedal has been sharply depressed, it is possible to rapidly determine whether or not the brake pedal has been sharply depressed, in comparison with, for example, the case where a result of detection of the master cylinder pressure is used for the determination. Therefore, when the brake pedal is sharply depressed, the wheel cylinder pressure can be rapidly increased.

According to the invention, the braking force can be rapidly increased when the brake pedal is sharply depressed.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Hereinafter, embodiments of the invention will be described in detail with reference to the drawings.

Figure 1:
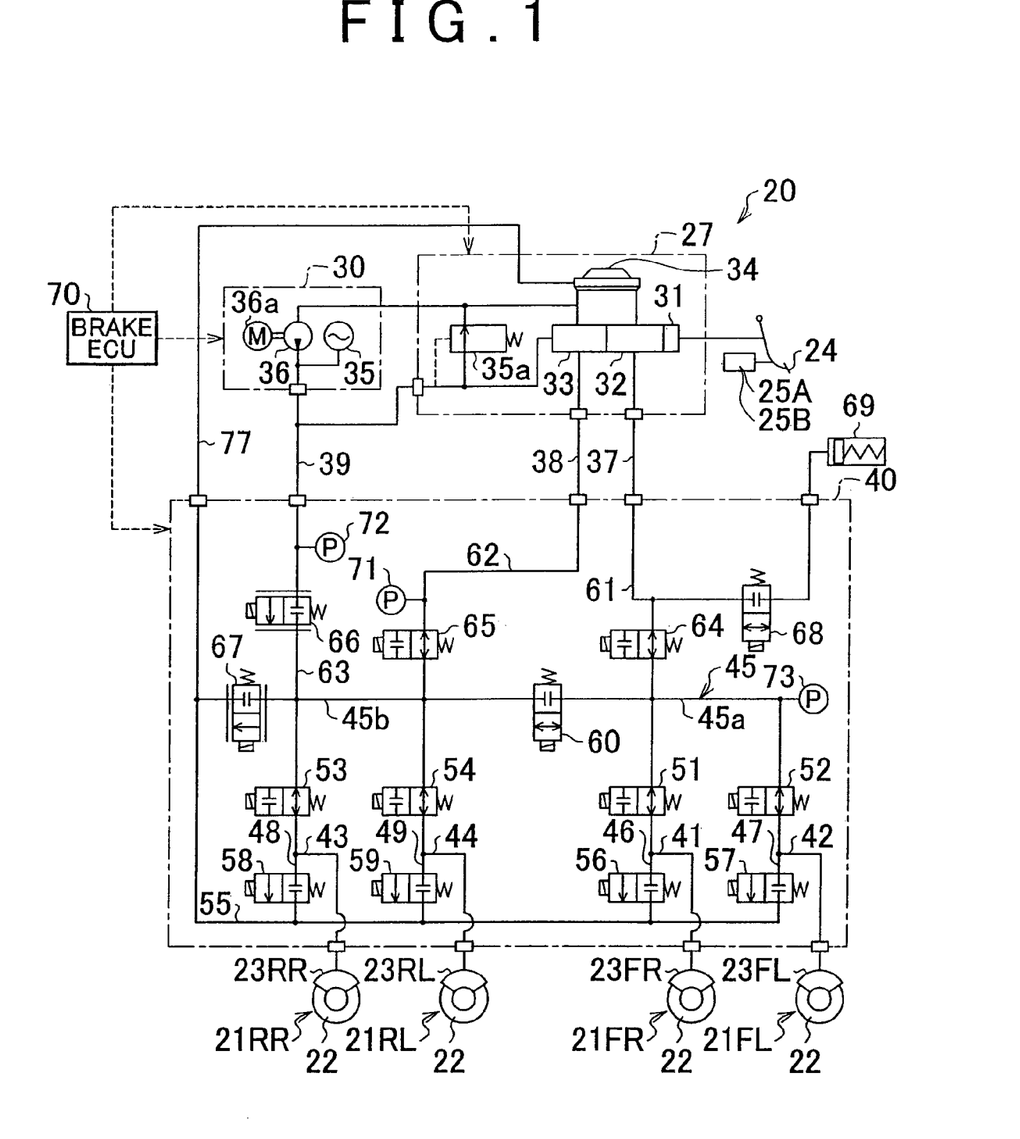
FIG. 1 is a system diagram showing a braking control device in accordance with an embodiment of the invention.

FIG. 1 is a system diagram showing a braking control device 20 in accordance with an embodiment of the invention. A braking control device 20 shown in the diagram constitutes an electronically controlled brake system (ECB) for a vehicle, and controls the braking force applied to four wheels that are provided on the vehicle. The braking control device 20 in accordance with this embodiment is mounted in, for example, a hybrid vehicle that is equipped with an electric motor and an internal combustion engine as vehicle drive force sources. Such a hybrid vehicle uses each of the regenerative braking that brakes the vehicle by regenerating kinetic energy of the vehicle into electric energy, and the hydraulic braking performed by the braking control device 20, to brake the vehicle. The vehicle in this embodiment executes a brake regeneration coordination control of generating a desired braking force through the combined use of the regenerative braking and the hydraulic pressure braking.

The braking control device 20, as shown in FIG. 1, includes disc brake units 21FR, 21FL, 21RR, 21RL, a master cylinder unit 27, a power hydraulic pressure source 30, and a hydraulic actuator 40.

The disc brake units 21FR, 21FL, 21RR, 21RL apply braking force to a right front wheel, a left front wheel, a right rear wheel, and a left rear wheel, respectively, of the vehicle. The master cylinder unit 27 as a manual hydraulic pressure source in this embodiment sends out to the disc brake units 21FR to 21RL a brake fluid that is pressurized according to the amount of the operation of a brake pedal 24 as a brake operating member performed by a driver of the vehicle. The power hydraulic pressure source 30 sends out the brake fluid as a working fluid pressurized by using power supplied, to the disc brake units 21FR to 21RL independently of the driver's operation of the brake pedal 24. The hydraulic actuator 40 appropriately adjusts the hydraulic pressure of the brake fluid supplied from the power hydraulic pressure source 30 or the master cylinder unit 27, and sends out the hydraulic pressures to the disc brake units 21FR to 21RL. Thus, the braking force to each wheel provided by the hydraulic pressure braking is adjusted.

The disc brake units 21FR to 21RL, the master cylinder unit 27, the power hydraulic pressure source 30, and the hydraulic actuator 40 will be described more in detail below. Each of the disc brake units 21FR to 21RL includes a brake disc 22 and a wheel cylinder 23FR to 23RL that is contained in a brake caliper. The wheel cylinders 23FR to 23RL are connected to the hydraulic actuator 40 via their respective fluid passageways. For the sake of convenience, the wheel cylinders 23FR to 23RL will be collectively termed "wheel cylinder 23" in the following description.

In each of the disc brake units 21FR to 21RL, when the wheel cylinder 23 is supplied with brake fluid from the hydraulic actuator 40, a brake pad as a friction member is pressed against the brake disc 22 that rotates together with the wheel. Due to this, braking force is applied to each wheel. Although this embodiment employs the disc brake units 21FR to 21RL, different types of braking force application devices that have wheel cylinders 23 of drum brakes or the like.

The master cylinder unit 27 is a hydraulic pressure booster-equipped master cylinder in this embodiment, and includes a hydraulic pressure booster 31, a master cylinder 32, a regulator 33, and a reservoir 34. The hydraulic pressure booster 31 is linked to the brake pedal 24, and amplifies the pedal depression force exerted on the brake pedal 24, and transmits the amplified force to the master cylinder 32. The pedal depression force is amplified as the brake fluid is supplied from the power hydraulic pressure source 30 to the hydraulic pressure booster 31 via the regulator 33. Then, the master cylinder 32 generates a master cylinder pressure that has a predetermined boost ratio relative to the pedal depression force.

The reservoir 34 that reserves the brake fluid is disposed on top of the master cylinder 32 and the regulator 33. The master cylinder 32 hydraulically communicates with the reservoir 34 when the brake pedal 24 is not depressed. On the other hand, the regulator 33 is in hydraulic communication with both the reservoir 34 and an accumulator 35 of the power hydraulic pressure source 30. Using the reservoir 34 as a low-pressure source and the accumulator 35 as a high-pressure source, the regulator 33 generates a hydraulic pressure that is substantially equal to the master cylinder pressure. The hydraulic pressure generated by the regulator 33 will be suitably referred to as "regulator pressure" below. Incidentally, the master cylinder pressure and the regulator pressure do not need to be strictly equal. For example, it is also possible to design the master cylinder unit 27 so that the regulator pressure is slightly higher than the master cylinder pressure.

The master cylinder 32 and the regulator 33 each have a so-called idle stroke. The idle stroke is a stroke occurring during a period from the depression of the brake pedal 24 from a state of no performance of brake operation until the connection of the master cylinder 32 or the regulator 33 with the reservoir 34 is discontinued.

During the idle stroke, since the master cylinder 32 and the regulator 33 are in hydraulic communication with the reservoir 34, the hydraulic pressures thereof do not rise. The master cylinder unit 27 in the embodiment is constructed so that during an early period of depression of the brake pedal 24, as the stroke of the pedal 24 increases, the idle stroke of the regulator 33 first reduces, and then the idle stroke of the master cylinder 32 reduces. That is, the regulator 33 and the master cylinder 32 are disconnected in that order from the reservoir 34.

For the sake of convenience in description below, the pedal stroke at which the connection between the regulator 33 and the reservoir 34 discontinues is termed the first disconnection stroke, and the stroke at which the connection between the master cylinder 32 and the reservoir 34 discontinues is termed the second disconnection stroke. In this embodiment, the second disconnection stroke is larger than the first disconnection stroke. In the case where the pedal stroke is between the first disconnection stroke and the second disconnection stroke, the pressure of the regulator 33 becomes higher than that of the master cylinder 32, and thus a differential pressure occurs between the two working liquid chambers. This is because the regulator 33 is disconnected from the reservoir 34 and its working liquid is pressurized according to the stroke while the master cylinder 32 is still connected to the reservoir 34 and its hydraulic pressure does not rise.

The power hydraulic pressure source 30 includes the accumulator 35 and a pump 36. The accumulator 35 converts the pressure energy of the brake fluid pressurized by the pump 36 into pressure energy of a sealed gas, such as nitrogen or the like, for example, into about 14 to 22 MPa, and then stores the pressure energy. The pump 36 has a motor 36a as a drive source. A suction opening of the pump 36 is connected to the reservoir 34 while an ejection opening thereof is connected to the accumulator 35. Due to the pump 36, the accumulator pressure is kept within a set range that needs to be maintained (sometimes referred to as "permissible range" in this embodiment). A brake ECU 70, on the basis of the measured value of an accumulator pressure sensor 72, turns on the pump 36 to increase the accumulator pressure in the case where accumulator pressure falls below a lower limit of the permissible range, and turns off the pump 36 to end the pressurization in the case where the accumulator pressure exceeds an upper limit of the permissible range.

Besides, the accumulator 35 is also connected to a relief valve 35a that is provided in the master cylinder unit 27. If the pressure of the brake fluid in the accumulator 35 abnormality heightens, for example, to about 25 MPa, the relief valve 35a opens, so that high-pressure brake fluid is returned to the reservoir 34.

As described above, the braking control device 20 has the master cylinder 32, the regulator 33 and the accumulator 35 as brake fluid supply sources for the wheel cylinders 23. A master piping 37 is connected to the master cylinder 32. Likewise, a regulator piping 38 and an accumulator piping 39 are connected to the regulator 33 and the accumulator 35, respectively. The master piping 37, the regulator piping 38 and the accumulator piping 39 are connected to the hydraulic actuator 40.

The hydraulic actuator 40 includes an actuator block in which a plurality of channels are formed, and also includes a plurality of electromagnetic control valves. The channels formed in the actuator block include individual channels 41, 42, 43, 44, and a main channel 45. The individual channels 41 to 44 are branched from the main channel 45, and connected to the corresponding wheel cylinders 23FR, 23FL, 23RR, 23RL of the disc brake units 21FR, 21FL, 21RR, 21RL, respectively. Due to this, each wheel cylinder 23 is linkable in hydraulic communication with the main channel 45.

Besides, intermediate portions of the individual, channels 41, 42, 43, 44 are provided with ABS retention valves 51, 52, 53, 54, respectively. Each of the ABS retention valves 51 to 54 is, a normally-open type electromagnetic control valve which has a spring and a solenoid that is on/off controlled, and which is open in the case where its solenoid is in a non-electrified state. The ABS retention valves 51 to 54 in the open state are each able to allow the brake fluid to flow in both directions. That is, each ABS retention valve is able to allow the brake fluid to flow from the main channel 45 to the wheel cylinder 23, and is also able to allow the brake fluid to flow from the wheel cylinder 23 to the main channel 45. When any one of the ABS retention valves 51 to 54 is closed due to electrification of its solenoid, the passage of the brake fluid in its corresponding one of the individual channels 41 to 44.

Furthermore, the wheel cylinders 23 are connected to the reservoir channel 55 via pressure-reducing channels 46, 47, 48, 49 that are connected to the individual channels 41 to 44, respectively. Intermediate portions of the pressure-reducing channels 46, 47, 48, 49 are provided with ABS pressure reduction valves 56, 57, 58, 59, respectively. Each of the ABS pressure reduction valves 56 to 59 is a normally-closed type electromagnetic control valve that has a sprig and a solenoid that is on/off controlled, and that is closed when the solenoid is in a non-electrified state. When the ABS pressure reduction valves 56 to 59 are in the closed state, the passage of the brake fluid in the pressure-reducing channels 46 to 49 is blocked. When the ABS pressure reduction valves 56 to 59 are opened by electrification of the solenoids, the passage of the brake fluid in the pressure-reducing channels 46 to 49 is permitted, so that the brake fluid returns from the wheel cylinders 23 to the reservoir 34 via the pressure-reducing channels 46 to 49 and the reservoir channel 55. Incidentally, the reservoir channel 55 is connected to the reservoir 34 of the master cylinder unit 27 via a reservoir piping 77.

An intermediate portion of the main channel 45 has a separation valve 60. Due to the separation valve 60, the main channel 45 is divided into a first channel 45a connected to the individual channels 41 and 42, and a second channel 45b connected to the individual channels 43 and 44. The first channel 45a is connected to the wheel cylinders 23FR, 23FL for the front wheels via the individual channels 41, 42. The second channel 45b is connected to the wheel cylinders 23RR, 23RL for the rear wheels via the individual channels 43, 44.

The separation valve 60 is a normally-closed type electromagnetic control valve which has a spring and a solenoid that is on/off controlled, and which is closed when the solenoid is in a non-electrified state. When the separation valve 60 is in the closed state, the passage of brake fluid in the main channel 45 is blocked. When the separation valve 60 is opened by electrification of the solenoid thereof, brake fluid can be passed in both directions between the first channel 45a and the second channel 45b.

Besides, in the hydraulic actuator 40, a master channel 61 and a regulator channel 62 that hydraulically communicate with the main channel 45 are formed. More specifically, the master channel 61 is connected to the first channel 45a of the main channel 45, and the regulator channel 62 is connected to the second channel 45b of the main channel 45. Furthermore, the master channel 61 is connected to the master piping 37 that hydraulically communicates with the master cylinder 32. The regulator channel 62 is connected to the regulator piping 38 that hydraulically communicates with the regulator 33.

An intermediate portion of the master channel 61 has a master cut-off valve 64. The master cut-off valve 64 is provided on a path of supply of brake fluid from the master cylinder 32 to the wheel cylinders 23. The master cut valve 64 is a normally-open type electromagnetic control valve which has a spring, and a solenoid that is on/off controlled, and which is guaranteed to be closed by the electromagnetic force generated by the solenoid upon when a prescribed control current is supplied, and which is opened when the solenoid is in the non-electrified state. The master cut valve 64, when in the open state, allows brake fluid to pass in both directions between the master cylinder 32 and the first channel 45a of the main channel 45. When the master cut valve 64 is closed by electrification of the solenoid with the prescribed control current, the passage of brake fluid in the master channel 61 is blocked.

A stroke simulator 69 is connected to the master channel 61 on the upstream side of the master cut valve 64, via a simulator cut valve 68. That is, the simulator cut valve 68 is provided in a channel that connects the master cylinder 32 and the stroke simulator 69. The simulator cut valve 68 is a normally-closed type electromagnetic control valve which has a spring, and a solenoid that is on/off controlled, and which is guaranteed to be opened by the electromagnetic force generated by the solenoid when a prescribed control current is supplied, and which is closed when the solenoid is in the non-electrified state. When the simulator cut valve 68 is in the closed state, the passage of brake fluid between the master channel 61 and the stroke simulator 69 is blocked. When the simulator cut valve 68 is opened by electrification of the solenoid, the brake fluid can be passed in both directions between the master cylinder 32 and the stroke simulator 69.

The stroke simulator 69 includes a plurality of pistons and springs, and delivers reaction force commensurate with the driver's depression force on the brake pedal 24 when the simulator cut valve 68 is open. As for the stroke simulator 69, it is permissible to adopt a stroke simulator that has a multi-stepped spring characteristic in order to improve the driver's brake operation feel.

An intermediate portion of the regulator channel 62 has a regulator cut-off valve 65. The regulator cut-off valve 65 is provided on a path of supply of brake fluid from the regulator 33 to the wheel cylinders 23. The regulator cut-off valve 65 is also a normally-open type electromagnetic control valve which has a spring, and a solenoid that is on/off controlled, and which is guaranteed to be closed by the electromagnetic force generated by the solenoid when a prescribed control current is supplied, and which is open when the solenoid is in the non-electrified state. The regulator cut valve 65, when in the open state, allows brake fluid to pass in both directions between the regulator 33 and the second channel 45b of the main channel 45. When the regulator cut valve 65 is closed by electrification of the solenoid, the passage of brake fluid in the regulator channel 62 is blocked.

In the hydraulic actuator 40, an accumulator channel 63 is also formed in addition to the master channel 61 and the regulator channel 62. An end of the accumulator channel 63 is connected to the second channel 45b of the main channel 45, and another end thereof is connected to the accumulator piping 39 that hydraulically communication with the accumulator 35.

An intermediate portion of the accumulator channel 63 has a pressure-increasing linear control valve 66. Besides, the accumulator channel 63, and the second channel 45b of the main channel 45 are connected to the reservoir channel 55 via a pressure-reducing linear control valve 67. Each of the pressure-increasing linear control valve 66 and the pressure-reducing linear control valve 67 has a linear solenoid and a spring, and is a normally-closed type electromagnetic control valve that is closed when the solenoid thereof is in the non-electrified state. In each of the pressure-increasing linear control valve 66 and the pressure-reducing linear control valve 67, the valve opening degree is adjusted in proportion to the current supplied to the solenoid thereof.

The pressure-increasing linear control valve 66 is provided as a common pressure-increasing control valve for the plurality of wheel cylinders 23 that are provided corresponding to the wheels. Likewise, the pressure-reducing linear control valve 67 is provided as a common pressure-reducing control valve for the wheel cylinders 23. That is, in this embodiment, the pressure-increasing linear control valve 66 and the pressure-reducing linear control valve 67 are provided as a pair of common control valves for the wheel cylinders 23 which control the supply and discharge of the working fluid sent out from the power hydraulic pressure source 30, with respect to the wheel cylinders 23. The provision of the pressure-increasing linear control valve 66 and the pressure-reducing linear control valve 67 for shared use for the wheel cylinders 23 as described above is preferable in light of cost in comparison with a construction in which linear control valves are provided individually for the wheel cylinders 23.

Incidentally, the differential pressure between the output and input openings of the pressure-increasing linear control valve 66 corresponds to the pressure difference between the pressure of brake fluid in the accumulator 35 and the pressure of brake fluid in the main channel 45. The differential pressure between the output and input openings of the pressure-reducing linear control valve 67 corresponds to the pressure difference between the pressure of brake fluid in the main channel 45 and the pressure of brake fluid in the reservoir 34. Furthermore, a relation of $F1+F3=F2$ holds where $F1$ is the electromagnetic drive force commensurate with the electric power supplied to the linear solenoid of the pressure-increasing linear control valve 66 or the pressure-reducing linear control valve 67, $F2$ is the elastic force of the spring thereof, and $F3$ is a differential pressure-exerted force commensurate with the differential pressure between the output and input openings of the pressure-increasing linear control valve 66 or the pressure-reducing linear control valve 67. Therefore, by continuously controlling the electric powers supplied to the linear solenoids of the pressure-increasing linear control valve 66 and the pressure-reducing linear control valve 67, the differential pressures between the output and input openings of the pressure-increasing linear control valve 66 and the pressure-reducing linear control valve 67 can be controlled.

In the braking control device 20, the power hydraulic pressure source 30 and the hydraulic actuator 40 are controlled by the brake ECU 70 as a control portion in this embodiment. The brake ECU 70 is constructed as a microprocessor that includes a CPU. Besides the CPU, the brake ECU 70 further has a ROM that stores various programs, a RAM that temporarily stores data, input/output ports, communication ports, etc. The brake ECU 70 is capable of communicating with a hybrid ECU (not shown) that is superior thereto, and the like. On the basis of control signals from the hybrid ECU and signals from various sensors, the brake ECU 70 controls the pump 36 of the power hydraulic pressure source 30, and the electromagnetic control valves 51 to 54, 56 to 59, 60, 64 to 68 that constitute the hydraulic actuator 40.

A regulator pressure sensor 71, the accumulator pressure sensor 72 and a control pressure sensor 73 are connected to the brake ECU 70. The regulator pressure sensor 71 detects the pressure of brake fluid in the regulator channel 62 on the upstream side of the regulator cut valve 65, that is, the regulator pressure, and gives a signal indicating the detected value, to the brake ECU 70. The accumulator pressure sensor 72 detects the pressure of brake fluid in the accumulator channel 63 on the upstream side of the pressure-increasing linear control valve 66, and gives a signal indicating the detected value, to the brake ECU 70. The control pressure sensor 73 detects the pressure of brake fluid in the first channel 45a of the main channel 45, and gives a signal indicating the detected value, to the brake ECU 70. The detected values of the pressure sensors 71 to 73 are sequentially given to the brake ECU 70 at predetermined intervals of time, and are stored and retained in predetermined storage areas in the brake ECU 70.

In the case where the separation valve 60 is in the open state, and the first channel 45a and the second channel 45b of the main channel 45 are in communication with each other, the output value of the control pressure sensor 73 indicates the hydraulic pressure on the low-pressure side of the pressure-increasing linear control valve 66, and also indicates the hydraulic pressure on the high-pressure side of the pressure-reducing linear control valve 67. Therefore, the output value thereof can be used for the control of the pressure-increasing linear control valve 66 and the pressure-reducing linear control valve 67. Besides, in the case where the pressure-increasing linear control valve 66 and the pressure-reducing linear control valve 67 are closed and where the master cut valve 64 is in the open state, the output value of the control pressure sensor 73 indicates the master cylinder pressure. Furthermore, in the case where the separation valve 60 is open so that the first channel 45a and the second channel 45b of the main channel 45 are in communication with each other and where the ABS retention valves 51 to 54 are open while the ABS pressure-reducing valves 56 to 59 are closed, the output value of the control pressure sensor 73 indicates the working fluid pressure that acts on each wheel cylinder 23, that is, the wheel cylinder pressure.

Furthermore, the sensors connected to the brake ECU 70 also include a first stroke sensor 25A and a second stroke sensor 25B that are provided on the brake pedal 24. The first stroke sensor 25A and the second stroke sensor 25B detect the pedal stroke as an amount of operation of the brake pedal 24, and gives a signal that indicates the detected value, to the brake ECU 70. The output values of the first stroke sensor 25A and the second stroke sensor 25B are also sequentially given to the brake ECU 70 at predetermined time intervals, and are stored and retained in predetermined areas in the brake ECU 70.

Besides, a stop lamp switch is connected to the brake ECU 70. The stop lamp switch becomes on when the brake pedal 24 is depressed. Due to this, a stop lamp is turned on. Besides, when the depression of the brake pedal 24 is released, the stop lamp switch becomes off, and the stop lamp is turned off. A signal that indicates the on/off state of the stop lamp switch is input to the brake ECU 70 from the stop lamp switch at predetermined time intervals, and is stored and retained in a predetermined storage area in the brake ECU 70.

The braking control device 20 constructed as described above is able to execute the brake regeneration coordination control. Upon receiving a braking request, the braking control device 20 starts braking. The braking request is generated when braking force needs to be applied to the vehicle, for example, when the driver operates the brake pedal 24, or the like. Receiving the braking request, the brake ECU 70 computes a requested braking force, and calculates a requested hydraulic pressure braking force that is a braking force to be generated by the braking control device 20, by subtracting the braking force produced by the regeneration, from the requested braking force. The effective value of the braking force produced by the regeneration is supplied from the hybrid ECU to the braking control device 20. Then, on the basis of the requested hydraulic pressure braking force calculated as described above, the brake ECU 70 calculates target hydraulic pressures of the wheel cylinders 23FR to 23RL The brake ECU 70 determines the value of the control current that is supplied to the pressure-increasing linear control valve 66 and pressure-reducing linear control valve 67 in accordance with a feedback control law so that the wheel cylinder pressures become equal to the target hydraulic pressures.

As a result, in the braking control device 20, brake fluid is supplied from the power hydraulic pressure source 30 to the individual wheel cylinders 23 via the pressure-increasing linear control valve 66, so that braking force is applied to the wheels. Besides, brake fluid is discharged from the wheel cylinders 23 via the pressure-reducing linear control valve 67 according to need so as to adjust the braking force applied to the wheels. In this embodiment, a wheel cylinder pressure control system is constructed, including the power hydraulic pressure source 30, the pressure-increasing linear control valve 66, the pressure-reducing linear control valve 67, etc. Via the wheel cylinder pressure control system, the braking force control of a so-called brake-by-wire method is performed. The wheel cylinder pressure control system is provided in parallel with the path of supply of brake fluid from the master cylinder unit 27 to the wheel cylinders 23. Incidentally, the braking control device 20 in accordance with the embodiment is able to control the braking force by the wheel cylinder pressure control system even in the case where the requested braking force is provided merely by utilizing the hydraulic pressure braking force, without utilizing the regenerative braking force.

In the case where the braking force control of the brake-by-wire method is performed, the brake ECU 70 causes the regulator cut valve 65 to be in the closed state, so that the brake fluid sent out from the regulator 33 is not supplied to the main channel 45. Furthermore, the brake ECU 70 causes the master cut valve 64 to be in the closed state, and the simulator cut valve 68 to be in the open state. This operation is performed in order that the brake fluid delivered from the master cylinder 32 in association with the operation of the brake pedal 24 performed by the driver will be supplied to the stroke simulator 69. During the brake regeneration coordination control, the differential pressure corresponding to the magnitude of the regenerative braking force acts between the upstream side and the downstream side of each of the regulator cut-off valve 65 and the master cut-off valve 64. Besides, the brake ECU 70 causes the separation valve 60 to be in the open state. Due to this operation, the wheel cylinder pressures are controlled to a common hydraulic pressure.

When the brake pedal 24 is depressed, the brake ECU 70 starts to calculate a target wheel cylinder pressure by utilizing detection results from the first stroke sensor 25A, the second stroke sensor 25B, and the control pressure sensor 73. Then, in order to achieve the calculated target wheel cylinder pressure, the brake ECU 70 controls the hydraulic actuator 40 so as to increase or decrease the wheel cylinder pressure. Therefore, the brake ECU 70 functions as a wheel cylinder pressure control portion that increases/decreases the wheel cylinder pressure by controlling the hydraulic actuator.

When the wheel cylinder pressure is increased/decreased by controlling the hydraulic actuator, the braking control device 20 in accordance with this embodiment carries out a hydraulic pressure gradient restriction control of providing a restriction regarding the hydraulic pressure gradient in the increasing/decreasing of the master cylinder pressure. By providing a restriction regarding the hydraulic pressure gradient in this manner, for example, the production of noise due to oil pressure pulsation can be prevented, and good brake feel is provided for a driver of the vehicle. However, for example, at the time of emergency, it sometimes happens that the brake pedal is suddenly depressed by the driver. If in this case, too, a restriction is provided on the hydraulic pressure gradient, it becomes difficult to sharply increase the wheel cylinder pressure and thereby rapidly increase the braking force.

Therefore, the braking control device 20 in the embodiment determines whether or not the brake pedal 24 has been sharply depressed, by utilizing the pedal depression amount detected within a range that is smaller than the pedal depression amount that is to give braking force to the wheels. In the case where it is determined that the brake pedal 24 has been sharply depressed, the brake ECU 70 relaxes the restriction on the hydraulic pressure gradient in the increasing of the wheel cylinder pressure which is imposed when the brake pedal 24 is not sharply depressed. Hereinafter, an execution procedure of the hydraulic pressure gradient restriction control will be described in conjunction with FIG. 2.

Figure 2:
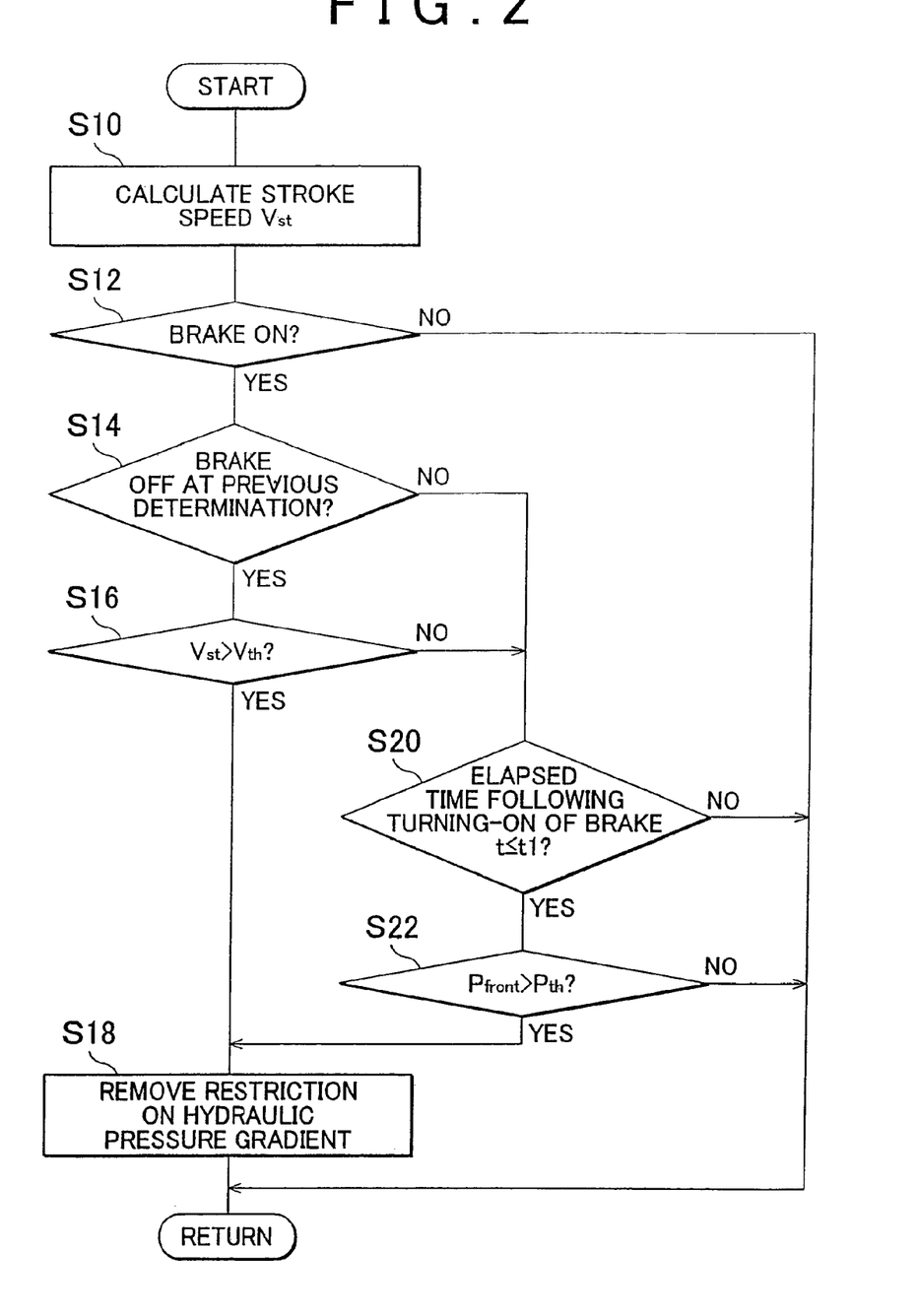
FIG. 2 is a flowchart showing an execution procedure of a hydraulic pressure gradient restriction control in the braking control device of the embodiment.

FIG. 2 is a flowchart showing an execution procedure of the hydraulic pressure gradient restriction control performed by the braking control device 20 in accordance with this embodiment. The process illustrated by this flowchart starts when the ignition switch of the vehicle is turned on. After that, the process is repeatedly carried out at every predetermined time until the ignition switch is turned off. In addition, data that show threshold values used in various determination processes in the hydraulic pressure gradient restriction control are stored beforehand in a storage portion such as the ROM or the like.

Firstly, the brake ECU 70 calculates a stroke speed Vst that is the depression speed of the brake pedal 24 (S10). Concretely, at every repetition timing of the process of the flowchart, the brake ECU 70 acquires a pedal depression amount of the brake pedal 24 by utilizing the output signal of the first stroke sensor 25A, and then stores data showing the acquired pedal depression amount into the RAM. The brake ECU 70 calculates a first stroke speed Vst1 using the following equation, where the present pedal depression amount detected in the present repetition cycle by the first stroke sensor 25A is expressed as $STRk1(n)$ and the previous pedal depression amount detected in the previous repetition cycle by the first stroke sensor 25A is expressed as $STRk1(n-1)$.

The first stroke speed $Vst1=(STRk1(n)-STRk1(n-1))/$the sampling time

Besides, at every repetition timing of the process of the flowchart, the brake ECU 70 acquires the pedal depression amount of the brake pedal 24 by utilizing the output signal of the second stroke sensor 25B, and then stores data showing the acquired pedal depression amount into the RAM. The brake ECU 70 calculates a second stroke speed Vst2 using the following equation, where the present pedal depression amount detected in the present repetition cycle by the second stroke sensor 25b is expressed as $STRk2(n)$ and the previous pedal depression amount detected in the previous repetition cycle by the second stroke sensor 25b is expressed as $STRk2(n-1)$.

The second stroke speed $Vst2=(STRk2(n)-STRk2(n-1))/$the sampling time

After calculating the first stroke speed Vst1 and the second stroke speed Vst2, the brake ECU 70 calculates a stroke speed Vst by calculating an average of the two speeds as in the following equation.

The stroke speed Vst=(the first stroke speed Vst1+the second stroke speed Vst2)/2

In this manner, the brake ECU 70 calculates the stroke speed Vst in a pedal depression amount that is smaller than the pedal depression amount that is utilized for the calculation of the target wheel cylinder pressure, by utilizing changes in the detected pedal depression amount. After calculating the stroke speed Vst, the brake ECU 70 determines whether or not the brake pedal 24 has been depressed to the pedal depression amount, that is, whether or not the brake has been turned on (S12). At this time, the brake ECU 70 determines whether or not the brake has been turned on by utilizing detection results from the first stroke sensor 25A, the second stroke sensor 25B, and the control pressure sensor 73. Since the determination procedure performed at this time is known to public, the description thereof is omitted herein. In the case where the brake remains off (NO in S12), the brake ECU 70 sets a brake flag to an off-state, and temporarily ends the process of the flowchart.

When the brake is turned on, the brake ECU 70 starts to calculate the target wheel cylinder pressure. In the hydraulic pressure gradient restriction control, when the brake is turned on (YES in S12), the brake ECU 70 firstly checks the state of the brake flag, and determines whether or not the brake was off at the time of the previous determination (S14), in order to determine whether to maintain a usual state in which the hydraulic pressure gradient in the increasing/decreasing of the wheel cylinder pressure is restricted, or to remove the restriction on the hydraulic pressure gradient. In the case where the brake was off at the time of the previous determination (YES in S14), the brake ECU 70 determines whether or not the brake pedal has been sharply depressed, by determining whether or not the stroke speed Vst calculated following the setting of the brake flag to the on-state is greater than a speed threshold value Vth (S16). If the calculated stroke speed Vst is greater than the speed threshold value Vth (YES in S16), the brake ECU 70 removes the restriction on the hydraulic pressure gradient (S18), and then temporarily ends the process of this flowchart. After the restriction on the hydraulic pressure gradient is removed, the brake ECU 70 increases the wheel cylinder pressure without any restriction on the hydraulic pressure gradient, even when increasing the wheel cylinder pressure so as to realize the calculated target wheel cylinder pressure.

Incidentally, in the case where it is determined that the brake pedal 24 has been sharply depressed, the brake ECU 70 may relax the restriction imposed on the hydraulic pressure gradient in increasing the wheel cylinder when the brake pedal 24 has not been sharply depressed, instead of removing the restriction on the hydraulic pressure gradient. Concretely, in the case where it is determined that the brake pedal 24 has been sharply depressed, the brake ECU 70 may set a hydraulic pressure gradient restriction value that is higher than the hydraulic pressure gradient restriction value imposed when the brake pedal 24 has not been sharply depressed, and may increase the wheel cylinder pressure so that the set hydraulic pressure gradient restriction value will not be exceeded.

In the case where the master cylinder pressure becomes high during a time from the turning-on of the brake until a predetermined time elapses, it is also possible to determine that the brake pedal 24 has been sharply depressed. Therefore, in the case where the brake was also on at the time of the previous determination (NO in S14), or the case where it is presently determined that the brake is on but the stroke speed Vst is less than or equal to the speed threshold value Vth (NO in S16), the brake ECU 70 determines whether or not the elapsed time t following the turning-on of the brake is less than or equal to a time threshold value t1, that is, whether or not there remains time within the length of time of the time threshold value t1 following the turning-on of the brake (S20). In this embodiment, the time threshold value t1 is set at 30 milliseconds.

In the case where the brake is off and the case where the brake has just become on, the hydraulic pressure Pfront that is the output value of the control pressure sensor 73 shows the master cylinder pressure since the pressure-increasing linear control valve 66 and the pressure-reducing linear control valve 67 are closed and the master cut-off valve 64 is in the open state. Therefore, in the case where the time of the time threshold value t1 has not elapsed following the turning-on of the brake (YES in S20), the brake ECU 70 determines whether or not the hydraulic pressure Pfront detected by the control pressure sensor 73 is greater than a pressure threshold value Path (S22). Due to this, the brake ECU 70 determines whether or not the brake pedal has been sharply depressed. Incidentally, although in this embodiment, the master cylinder pressure is detected by utilizing the output value of the control pressure sensor 73 that is less subject to the hydraulic pressure pulsation, the master cylinder pressure may also be detected by utilizing the output value of the regulator pressure sensor 71.

In the case where the hydraulic pressure Pfront reaches the pressure threshold value Pth prior to the elapse of the time of the time threshold value t1 following the turning-on of the brake (YES in S22), the brake ECU 70 determines that the brake pedal 24 has been sharply depressed, and removes the restriction that is imposed on the hydraulic pressure gradient at the time of increasing the wheel cylinder pressure (S18). On the other hand, in the case where the time of the time threshold value t1 has elapsed following the turning-on of the brake (NO in S20), or in the case where it is determined that the hydraulic pressure Pfront is less than or equal to the pressure threshold value Pth (NO in S22), the brake ECU 70 determines that the brake pedal 24 has not been sharply depressed, and keeps the restriction value regarding the hydraulic pressure gradient at a usual value, and temporarily ends the process of this flowchart.

As described above, the brake ECU 70 firstly determines whether or not the brake pedal 24 has been sharply depressed, by utilizing the detected master cylinder pressure. In the case where although it is determined by utilizing changes in the pedal depression amount that the brake pedal 24 has not been sharply depressed, the occurrence of sharp depression of the brake pedal 24 has been determined by utilizing the master cylinder pressure, the brake ECU 70 removes the restriction imposed on the hydraulic pressure gradient at the time of increasing the wheel cylinder pressure. Due to this, the reliability of the determination as to whether the brake pedal 24 has been sharply depressed can be heightened, in comparison with the case where the determination is made only on the basis of the detection results from the first stroke sensor 25A and the second stroke sensor 25B.

The invention is not limited to the foregoing embodiments. On the contrary, suitable combinations of various elements of the embodiment are also effective as embodiments of the invention. Besides, it is also possible to add various modifications, such as design alterations and the like, to the foregoing embodiments on the basis of the knowledge of those of ordinary skill in the art. Embodiments with such modifications can also be included within the scope of the invention.

The invention claimed is:

1. A braking control device comprising:
a stroke sensor that detects a pedal depression amount of a brake pedal;
a hydraulic actuator provided so as to be capable of increasing/decreasing wheel cylinder pressure; and
a wheel cylinder pressure control portion that calculates a target wheel cylinder pressure by utilizing a detection result provided by the stroke sensor, and increases/decreases the wheel cylinder pressure by controlling the hydraulic actuator so as to achieve the target wheel cylinder pressure calculated, wherein
the wheel cylinder pressure control portion determines whether or not the brake pedal has been sharply depressed, by utilizing a detection result provided by the stroke sensor in a range of the pedal depression amount that is smaller than the pedal depression amount that is to give braking force to a wheel, and relaxes a restriction on a hydraulic pressure gradient at a time of increasing the wheel cylinder pressure which is imposed when the brake pedal has not been sharply depressed, if it is determined that the brake pedal has been sharply depressed.

2. The braking control device according to claim 1, wherein the wheel cylinder pressure control portion calculates a pedal depression speed at a pedal depression amount that is smaller than the pedal depression amount used to calculate the target wheel cylinder pressure, by utilizing the detection result provided by the stroke sensor, and determines whether or not the pedal depression speed calculated is greater than a predetermined threshold value, in order to determine whether or not the brake pedal has been sharply depressed.

3. The braking control device according to claim 2, wherein the stroke sensor includes a first stroke detection portion that detects the pedal depression amount that is used to calculate the target wheel cylinder pressure, and a second stroke detection portion that detects the pedal depression amount that is smaller than the pedal depression amount that is used to calculate the target wheel cylinder pressure.

4. The braking control device according to claim 3, wherein the pedal depression speed is calculated based on both the detection result from the first stroke detection portion and the detection result from the second stroke detection portion.

5. The braking control device according to claim 3, further comprising a master cylinder unit that includes a master cylinder, a regulator, and a reservoir, wherein the second stroke detection portion detects the pedal depression amount that amounts until at least one of the master cylinder and the regulator is disconnected from the reservoir.

6. The braking control device according to claim 1, wherein if it is determined that the brake pedal has been sharply depressed, the wheel cylinder pressure control portion does not impose the restriction on the hydraulic pressure gradient at the time of increasing the wheel cylinder pressure.

7. The braking control device according to claim 1, wherein if it is determined that the brake pedal has been sharply depressed, the wheel cylinder pressure control portion causes an upper limit value of the hydraulic pressure gradient at the time of increasing the wheel cylinder pressure to be higher than an upper limit value of the hydraulic pressure gradient imposed when the brake pedal has not been sharply depressed.

8. The braking control device according to claim 1, further comprising a master pressure sensor that detects the master cylinder pressure, wherein
the wheel cylinder pressure control portion further determines whether or not the brake pedal has been sharply depressed, by utilizing the detection result from the master pressure sensor, and relaxes the restriction on the hydraulic pressure gradient at the time of increasing the wheel cylinder which is imposed when the brake pedal has not been sharply depressed if it is determined by utilizing the detection result from the master pressure sensor that the brake pedal has been sharply depressed although it is determined by utilizing the detection result from the stroke sensor that the brake pedal has not been sharply depressed.

9. A braking control method comprising:

detecting a pedal depression amount of a brake pedal that is smaller than a pedal depression amount of the brake pedal that is to give braking force to a wheel;

determining whether or not the brake pedal has been sharply depressed, by utilizing the pedal depression amount detected;

detecting depression of the brake pedal to the pedal depression amount that is to give braking force to the wheel; and relaxing a restriction imposed on hydraulic pressure gradient when the brake pedal has not been sharply depressed, and increasing the wheel cylinder pressure, if the depression of the brake pedal to the pedal depression amount that is to give braking force to the wheel is detected and it is determined that the brake pedal has been sharply depressed.

* * * * *